Figure 1:
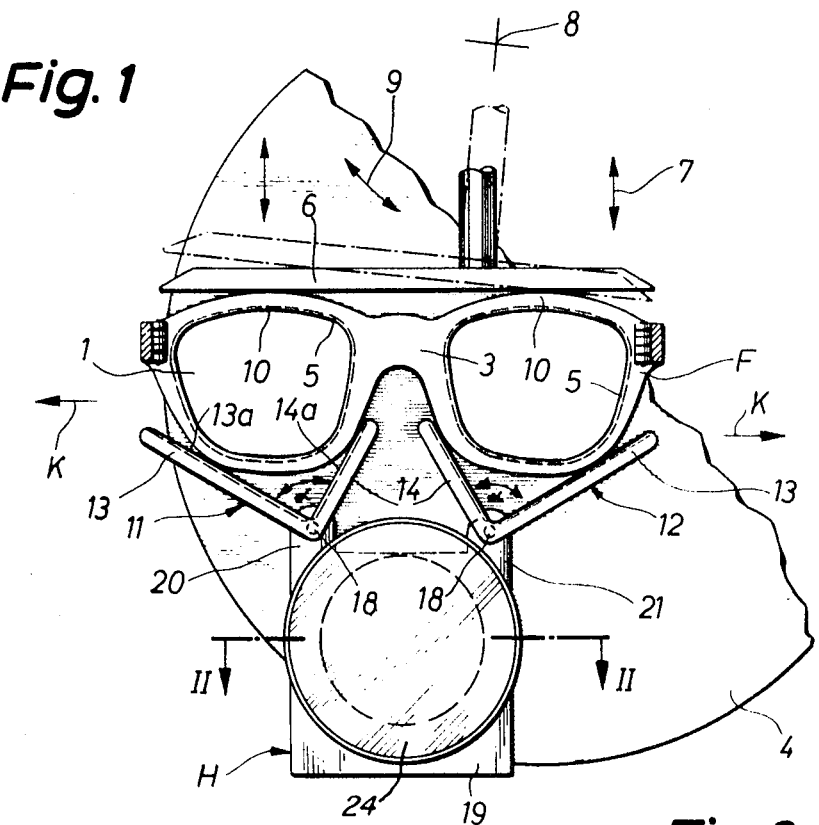

United States Patent

[11] 3,622,144

[72] Inventor  Fritz Kotting
                Sturzelberg, Germany
[21] Appl. No. 865,084
[22] Filed      Oct. 9, 1969
[45] Patented   Nov. 23, 1971
[73] Assignee   Firma Wernicke & Co.
                Dusseldorf-Eller, Germany
[32] Priority   Nov. 11, 1968
[33]            Germany
[31]            P 18 07 474.3

[54] APPARATUS FOR HOLDING A GLASS MOUNT ON A PLATE-SHAPED SUPPORT
7 Claims, 4 Drawing Figs.

[52] U.S. Cl. .................................................. 269/104,
                                                 269/148, 269/305
[51] Int. Cl. .................................................. B25b 5/14
[50] Field of Search .......................................... 269/104,
        105, 110, 141, 148, 149, 203, 258–284, 304, 305,
        266, 268, 270; 287/189.36 F; 24/263 LL, 263 LS

[56] References Cited
UNITED STATES PATENTS

| 395,661 | 1/1889 | Morgan | 269/203 |
| 1,203,152 | 10/1916 | Steudner | 269/258 |
| 1,349,632 | 8/1920 | Staley | 269/203 X |
| 2,473,321 | 6/1949 | Yanko | 24/263 LS UX |
| 2,724,296 | 11/1955 | Parrish | 269/258 X |

FOREIGN PATENTS

| 1,063,271 | 1953 | France | 269/261 |

Primary Examiner—Andrew R. Juhasz
Assistant Examiner—F. R. Bilinsky
Attorneys—James M. Heilman and Heilman & Heilman ABSTRACT: A clamping means for securing a glass frame on a flat circular support. The glass frame is held between a straight bar and two angular retaining means which are pivotally secured to a clamping plate. The clamping plate is adjustable and is clamped to the circular support by a manually operated nut.

PATENTED NOV 23 1971  3,622,144

INVENTOR.
FRITZ KÖTTING
BY James M. Heilman
ATTORNEY.

APPARATUS FOR HOLDING A GLASS MOUNT ON A PLATE-SHAPED SUPPORT

The invention relates to an apparatus for holding a glass mount on a plate-shaped support with a part bearing on a section of the mount and other means for retaining the mount of the support. With respect to the nomenclature of the terms the glass mount according to this invention is only the part that comprises the two holes or apertures for receiving the lenses of the glasses and which is to be clamped in the present case. The sides which hold the lens mount on the head of the user and which extend behind the ears form together with the glass mount the glass frame or spectacle frame.

An apparatus is known where a bar or rule is used against which an upper part of the glass mount bears and where the glass mount is pressed by means of spring elements against its support. Such an apparatus is not suitable for all purposes since the spring elements with which the mount is held on the support must be strong to avoid slipping when the mount is treated or scanned. If the spring force is great, there is a risk of deformation particularly in metal mounts; if it is too weak, the mount slips on the support since it has mostly a smooth metallic surface. In addition, clamping the mount with the known spring devices represents a relatively cumbersome operation.

The object of the invention is to provide an apparatus of the above-mentioned type which corresponds not only to the different glass mounts of modern form, but where the glass mount can be clamped so firmly that it can be worked or scanned with a tool, feeler, etc., and where the clamping of the glass mount itself can be effected rapidly and without great skill.

In order to achieve this objective, the invention provides an apparatus of the above-mentioned type which is characterized in that the holding means consist of bars, etc., connected angularly with each other in pairs and mounted pivotally on an adjustable retaining block. Preferably two identical angular retaining means are arranged on a plate of the retaining block so that, when the retaining block is shifted, the bars of the retaining means move automatically into a position in which they press the glass mount against a retaining rule etc. bearing on the identical lower arc-shaped sections, the upper part of the glass mount bearing on this retaining rule etc.

In a further embodiment of the invention, the angular retaining means consist of a shorter and of a longer bar which form with each other an angle of 90° approximately 90°. The center of gravity of the angular retaining means is arranged preferably at the two ends of one edge of the plate of the retaining block.

In the practical realization, the two fulcrums of the two angle bars of a retaining means are arranged substantially in the distance of the width of the bridge portion of the mount, the pivot bearing of the angle bars being arranged at or near the junction of the two bars of an angular retaining means. The shorter bars of the two retaining means face each other.

Since modern glass mounts generally have a curved globular form, the inside of the bars is provided with a longitudinal profile. This permits in connection with the pivotal angle bars to press the glass mount, despite the curvature, firmly against the retaining rule of the apparatus and the plate-shaped support, in other words, it is no longer necessary to press the mount elastically against the support, which involves the risk of a deformation of the mount and thus of a distortion of the part of the mount receiving the lens chamfer.

The retaining block of the apparatus consists preferably of a rotatable and radially adjustable plate which is traversed by a stationary threaded pin on which can be screwed a clamping nut. Such a design of the retaining block makes it possible to shift the angular retaining means at will both parallel and perpendicularly to the longitudinal axis of the glass mount.

In a further embodiment of the invention the retaining block plate is provided with a central bore which is greater than the threaded pin traversing it. The height and thickness respectively of the angle bars is greater than the height and thickness of the retaining block plate so that when the retaining block is locked by the clamping nut, the angle bars are clamped at the same time against the support of the apparatus on which the glass mount rests. When the clamping nut is tightened, this results not only in a tightening of the plate of the retaining block, but it also prevents the pivotal movement of the angle pieces.

An embodiment of the invention is represented in the drawing.

Figure 3:
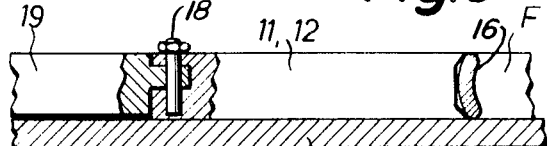
Figure 2:
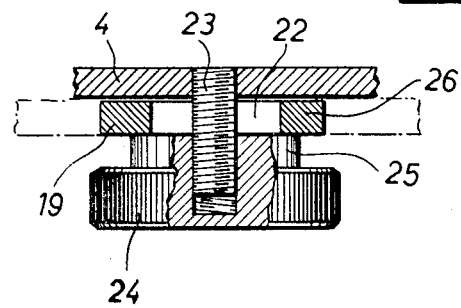
Figure 4:
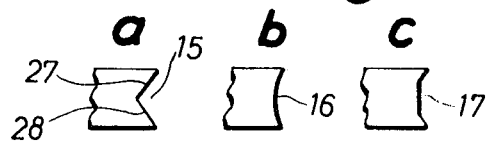

FIG. 1 shows the apparatus with a glass mount in a top view,
FIG. 2 shows a section along the line II—II of FIG. 1,
FIG. 3 shows a side view of a bar, partly in a section and
FIG. 4 shows various possibilities of designing the profiles of the inside of the angle bars.

The glass amount F with the glass mount opening 1, 2 and the bridge portion 3 rests on a disk-shaped support and is to be retained thereon in the presented positions, for example, so that a feeler, not represented here, can scan the inner edge 5 of the openings 1, 2.

The support 4 carries a retaining rule 6 which can be shifted both in the direction of the arrow 7 and turned about a fulcrum 8 in the direction of the arrow 9. This retaining rule 6 rests with its lower part on the support 4 or is arranged a short distance above this support in such a way that the glass mounted F, as represented in FIG. 1, can bear with the sections 10 on the rule.

The glass mount F is pressed against the tightened retaining rule 6 by means of two angular retaining means 11, 12. Each of these retaining means consists of a longer bar 13 and a shorter bar 14, the two bars 13, 14 of two retaining means facing each other. The two bars 13, 14 of retaining means 11, 12 are rigidly connected with each other at an angle of about 90° and carry on their inside a profile according to FIGS. 4a, 4b, 4c, which can be either a triangular profile 15, a round profile 16 or a polygonal profile 17.

The two angular retaining means 11, 12 can turn freely about journals 18 which are secured on the plate 19 of a retaining block H, the bars 13, 14 having a height which is somewhat greater than the thickness of the plate 19, as it can be seen from FIG. 2 and 3.

The plate 19 at the two corners 20, 21 of which the angle bars 13, 14 are mounted freely for rotation, has a round opening 22, through which protrudes a threaded pin 23 connected with the support 4, on which can be screwed a clamping nut 24 whose edge 25 protrudes over the edge section 26 of the bore 22. The latter is much greater than the diameter of the pin 23 so that the plate can be adjusted radially and laterally about the pin 23 when the nut 24 is loosened. When the nut is tightened on the threaded pin 23, the angle bars 13, 14 are clamped against the support 4 since the height and thickness of the angle bars is greater than that of the plate 19. This fixes not only the position of the plate 19 and thus of the retaining block H, but it also prevents the turning of the bars 13, 14 so that the bars 13, 14 are rigidly connected with the support 4. It is irrelevant if the angle bars 13, 14 are pressed vigorously against the glass mount, since this could at most have the result that the two opening sections of the glass mount F on the bridge 3 are pulled apart slightly in the direction of the arrow K, without the openings 1, 2 themselves, being deformed however. Such a strong clamping of the glass mount is therefore insignificant for the scanning of the inner edge 5.

Due to the height and thickness of the angle bars and the profile on the inside 13a, 14a of the bar, the globular curvature of the glass mount, as it is found in modern glasses, is taken into account in such a way that it is irrelevant whether the glass mount bears in the proximity of the lower or upper edge of the bar, for example, at 27 or 28 in FIG. 4a..

The operation of the apparatus according to the invention is also ensured when the bars 13, 14 are not pressed against the support 4, but when the mount F is pressed by the bars 13, 14 against the retaining rule 6.

I claim:

1. Apparatus for clamping a glass frame to a flat supporting plate comprising a bar secured by a fulcrum to the supporting plate for engaging one side of the glass frame, a clamping plate secured to the supporting plate by a fastening means, and two angular clamps coupled to the clamping plate for engaging other sides of the glass frame, said angular clamps connected to the clamping plate by pivot pins and each including a portion which extends under the pivot pin for clamping engagement with the supporting plate when the screw fastening means is tightened.

2. Apparatus according to claim 1 wherein the angular clamping means each consists of two bars positioned at an angle to each other.

3. Apparatus according to claim 2 wherein the two angular retaining means are mounted at positions on the clamping plate which are spaced apart from each other.

4. Apparatus according to claim 2 wherein the pivot pin for each angular retaining means is positioned adjacent to the junction of the bars.

5. Apparatus according to claim 2 wherein the inside faces of the bars are formed with a longitudinal concave profile.

6. Apparatus according to claim 1 wherein said clamping plate includes a flat rotatable and radially adjustable plate secured to the supporting plate by a single screw and manually operable nut.

7. Apparatus according to claim 6 wherein said clamping plate is provided with a central bore which is greater than the threaded pin traversing it.

* * * * *